US012182785B2

(12) United States Patent
Hasek, IV

(10) Patent No.: US 12,182,785 B2
(45) Date of Patent: Dec. 31, 2024

(54) CONTENT DELIVERY SYSTEMS THAT USE BLOCKCHAIN TO MANAGE CONTENT

(71) Applicant: T-Mobile USA, Inc., Bellevue, WA (US)

(72) Inventor: Charles A. Hasek, IV, Denver, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 135 days.

(21) Appl. No.: 17/735,396

(22) Filed: May 3, 2022

(65) Prior Publication Data

US 2022/0261776 A1    Aug. 18, 2022

Related U.S. Application Data

(62) Division of application No. 16/520,963, filed on Jul. 24, 2019.

(51) Int. Cl.
| | |
|---|---|
| *G06Q 20/12* | (2012.01) |
| *G06F 16/182* | (2019.01) |
| *H04L 9/06* | (2006.01) |
| *H04L 65/612* | (2022.01) |

(52) U.S. Cl.
CPC ..... *G06Q 20/1235* (2013.01); *G06F 16/1837* (2019.01); *H04L 9/0637* (2013.01); *H04L 65/612* (2022.05)

(58) Field of Classification Search
CPC ............ G06Q 20/00–425; H04L 9/00–50
See application file for complete search history.

(56) References Cited

U.S. PATENT DOCUMENTS

| | | | |
|---|---|---|---|
| 9,237,446 B2 | 1/2016 | Vieira | |
| 10,114,970 B2 | 10/2018 | Goldfarb et al. | |
| 2006/0159264 A1 | 7/2006 | Chen | |
| 2008/0235746 A1* | 9/2008 | Peters | H04N 21/4627 348/E7.071 |
| 2015/0101022 A1 | 4/2015 | Zent et al. | |

(Continued)

OTHER PUBLICATIONS

Andreas M. Antonopoulos, "Mastering Bitcoin", Dec. 1, 2014, O'Reilly Media, Inc., First Edition (Year: 2014).*

(Continued)

*Primary Examiner* — Ari Shahabi
(74) *Attorney, Agent, or Firm* — Lee & Hayes, P.C.

(57) ABSTRACT

A content delivery network uses blockchain to manage content. In various implementations, the content delivery network may specify access rights to content in a blockchain network and allow a content access device to access content when the blockchain network is unavailable using a local copy of the blockchain and reconciling upon reconnection. In some implementations, the content delivery network may track storage of available content in a blockchain and use the blockchain to provide different copies of requested items when the different copies can be provided faster, more efficiently, at a lower cost, and so on. In yet other implementations, the content delivery network may record changes to properties of content in a blockchain and evaluate received disputes by using the blockchain to determine whether a change to the properties of the content occurred prior to the dispute.

19 Claims, 12 Drawing Sheets

(56) References Cited

U.S. PATENT DOCUMENTS

| | | |
|---|---|---|
| 2015/0170112 A1* | 6/2015 | DeCastro ............. G06Q 20/367 |
| | | 705/39 |
| 2015/0172731 A1* | 6/2015 | Hasek .............. H04N 21/26258 |
| | | 725/28 |
| 2016/0140637 A1 | 5/2016 | Szabo et al. |
| 2017/0181052 A1* | 6/2017 | Zhang .................. H04W 36/38 |
| 2018/0089651 A9 | 3/2018 | Lund et al. |
| 2018/0137507 A1 | 5/2018 | Jayachandran et al. |
| 2019/0028278 A1 | 1/2019 | Gilson |
| 2020/0175136 A1 | 6/2020 | Chen et al. |
| 2021/0027265 A1 | 1/2021 | Hasek, IV |
| 2022/0261777 A1 | 8/2022 | Hasek, IV |

OTHER PUBLICATIONS

Mastering Bitcoin (Year: 2014).*
Office Action for U.S. Appl. No. 17/735,793, mailed on Oct. 4, 2023, Inventor #1 Charles A. Hasek, "Content Delivery Systems That Use Blockchain to Manage Content," 31 pages.
Office Action for U.S. Appl. No. 17/735,793, mailed on Apr. 9, 2024, Hasek IV, "Content Delivery Systems That Use Blockchain to Manage Content", 30 pages.

* cited by examiner

CONTENT DELIVERY SYSTEMS THAT USE BLOCKCHAIN TO MANAGE CONTENT

CROSS-REFERENCE TO RELATED APPLICATION(S)

This application is a divisional patent application of U.S. patent application Ser. No. 16/520,963, filed Jul. 24, 2019 and titled "Content Delivery Systems That Use Blockchain to Manage Content," the disclosure of which is hereby incorporated herein by reference in its entirety.

FIELD

The described embodiments relate generally to content delivery systems. More particularly, the present embodiments relate to content delivery systems that use blockchain to manage content.

BACKGROUND

Content delivery networks typically provide items of content to content access devices over a communication network. Examples of content access devices may include set top boxes, televisions, computing devices, smart phones, and so on. Examples of items of content may include one or more broadcast or on demand movies, television shows, videos, images, audio files, games, applications, and so on. The items of content may be obtained from one or more content providers stored in the content delivery network and/or may be stored outside but accessible through the content delivery network. The communication networks may include one or more coaxial cable networks, terrestrial broadcast networks, satellite networks, internets, and so on.

Content delivery networks may use a variety of different mechanisms to manage content stored within and/or otherwise accessible through the content delivery network. Content management may include tracking and enforcing access rights to content, storing and delivering content, tracking content pricing, charging for content access according to pricing, storing metadata about content, enabling content searching, billing for content access, routing content for delivery, providing payment to content providers, and so on.

SUMMARY

The present disclosure relates to a content delivery network that uses blockchain to manage content. In various implementations, a content delivery network may specify access rights to content in a blockchain network and allow a content access device to access content when the blockchain network is unavailable using a local copy of the blockchain and reconciling upon reconnection. In some implementations, a content delivery network may track storage of available content in a blockchain and use the blockchain to provide different copies of requested items when the different copies can be provided faster, more efficiently, at a lower cost, and so on. In yet other implementations, a content delivery network may record changes to properties of content in a blockchain and evaluate received disputes by using the blockchain to determine whether a change to the properties of the content occurred prior to the dispute.

In various embodiments, an electronic device includes a non-transitory storage medium that stores instructions and a processor. The processor executes the instructions to obtain from a blockchain network a local copy of a blockchain that specifies access rights to content in a content delivery network, receive a request to access a locally stored item of content while the blockchain network is unavailable, determine whether to allow the access using the local copy of the blockchain, and reconcile the local copy of the blockchain to the blockchain upon reconnection to the blockchain network.

In some examples, the access was allowed using the local copy of the blockchain and the processor reconciles the local copy of the blockchain to the blockchain by determining that no changes were made to the blockchain prior to the reconnection that impact allowance of the access. In other examples, the access was allowed using the local copy of the blockchain and the processor reconciles the local copy of the blockchain to the blockchain by determining that changes were made to the blockchain prior to the reconnection that impact allowance of the access and taking an action to remedy unauthorized access. In various implementations of such examples, the action includes billing an account for the access. In other implementations of such examples, the action includes denying subsequent access requests until access rights are updated to reflect the allowance of the access. In still other implementations of such examples, the action includes denying access to another locally stored item of content until access rights are updated to reflect the allowance of the access.

In a number of examples, the processor reconciles the local copy of the blockchain to the blockchain by updating the blockchain for a right requested to allow the access using the local copy.

In some embodiments, an electronic device includes a non-transitory storage medium that stores instructions and a processor. The processor executes the instructions to track storage of content available via a content delivery network in a blockchain, receive a request for an item of content, use the blockchain to determine that a different copy of the item of content can be provided, determine to provide the different copy of the item of content, and provide the different copy of the item of content to satisfy the request.

In various examples, the item of content is associated with a first accessory content, the different copy of the item of content is associated with a second accessory content, and the processor provides the first accessory content with the different copy of the item of content. In a number of examples, the item of content is associated with a first accessory content, the different copy of the item of content is associated with a second accessory content, and the processor provides the second accessory content with the different copy of the item of content.

In some examples, the processor determines to provide the different copy of the item of content because the processor determines that the different copy of the item of content can be provided faster than the item of content. In various examples, the processor determines to provide the different copy of the item of content because first content delivery network resources that would be used to provide the item of content are more burdened than second content delivery network resources that are used to provide the different copy of the item of content. In a number of examples, the processor determines to provide the different copy of the item of content because the different copy of the item of content is associated with a lower cost than the item of content. In some examples, the processor determines to provide the different copy of the item of content in response to user input.

In a number of embodiments, an electronic device includes a non-transitory storage medium that stores instructions and a processor. The processor executes the instructions to record changes to properties of content in a content delivery system in a blockchain, receive a dispute related to access of the content in the content delivery system, and evaluate the dispute by using the blockchain to determine whether a change to the properties of the content occurred prior to the dispute.

In various examples, the dispute relates to a price charged for an item of content and the change to the properties of the content is a price change for the item of content. In some implementations of such examples, the price was charged for the item at a first time, the price change occurred at a second time, and the processor evaluates the dispute by using the blockchain to determine whether the second time is prior to the first time. In other examples, the dispute relates to whether an item of content was accessed and the change to the properties of the content is an access status for the item of content. In various implementations of such examples, the access status indicates that the item of content was accessed, was partially accessed, was fully accessed, was not accessed, or could not be accessed.

In a number of examples, the processor is operative to resolve the dispute based on whether or not the change to the properties of the content occurred prior to the dispute.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
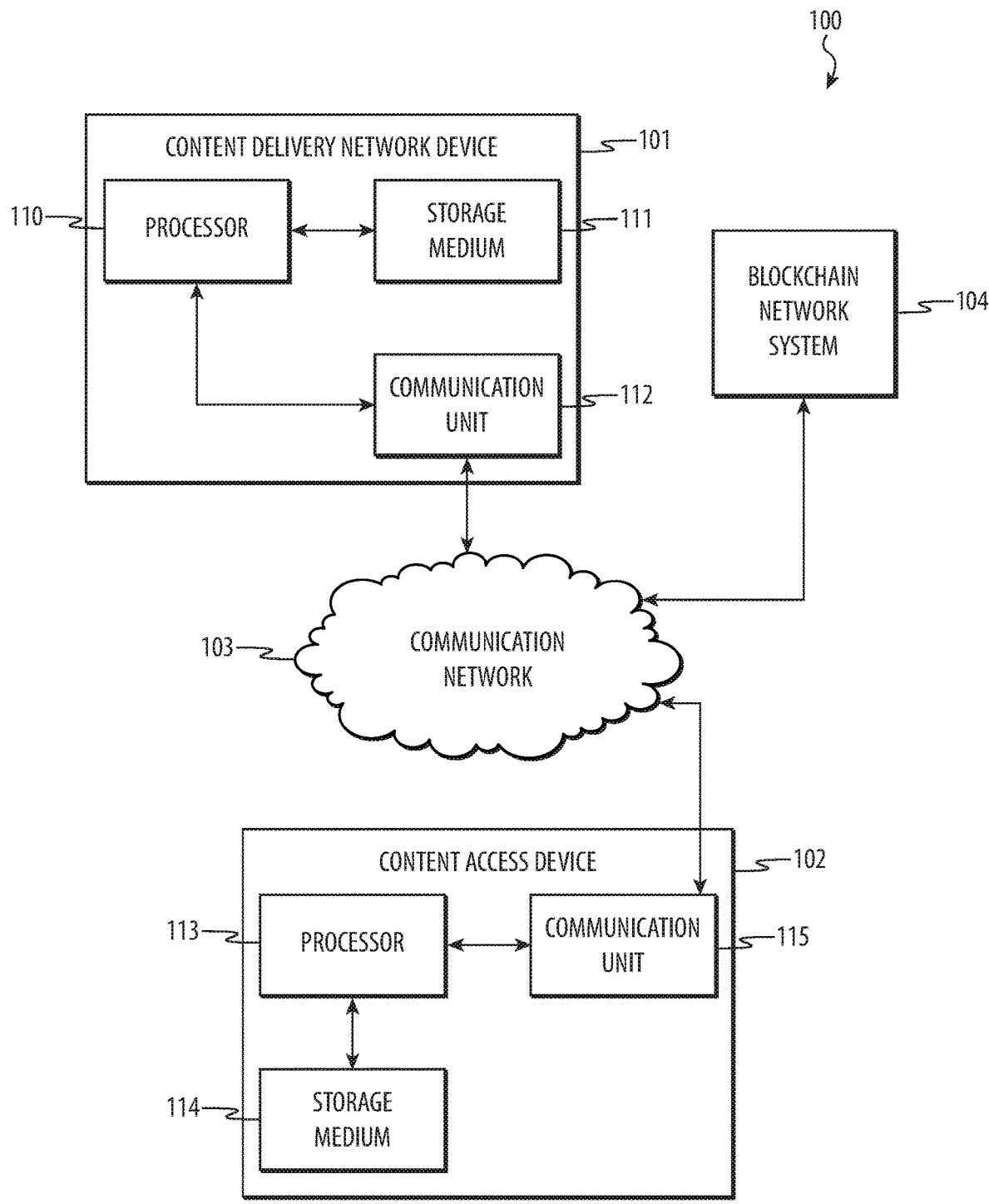
FIG. 1 depicts an example system for using blockchain to manage content in a content delivery network.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

The mechanisms used by content delivery networks to manage content stored within and/or otherwise accessible through the content delivery network may be limited in the completeness of information stored, how that information may be accessed, and so on. For example, a content access device may request access to an item of content over a network and, dependent on recorded content access rights, may receive a token from the content delivery network that allows access to the content. However, this kind of mechanism may not be feasible if the network is unavailable. By way of another example, a content delivery network may store metadata associated with items of content that describes information about the content. However, the information may not be centralized and multiple copies of the same item of content, with or without a same or a different associated accessory like advertising, may be stored without the ability to leverage the presence of the multiple copies. In yet another example, a content delivery system may store current properties of items of content (such as access rights, current pricing, access requested, and so on). However, these stored properties may not include sufficient information to allow the content delivery network to track or reliably prove when property changes occurred to be able to evaluate and/or resolve disputes relating to timing of property changes.

These kinds of limitations may be overcome by using blockchain to manage content in a content delivery network. Blockchains are decentralized and distributed databases or digital ledgers that are used to record transactions across many computers. The blockchain includes a list of records, referred to as "blocks," that may be linked and secured using cryptography. Each block may include a cryptographic hash of the previous block, a timestamp, and transaction data. The blockchain may be managed by a peer-to-peer network collectively adhering to a protocol for inter-node communication and validation of new blocks.

Each node in the network may store a complete copy of the entire blockchain. When a transaction is submitted, nodes of the network may come to a consensus according to the protocol regarding whether or not to validate the transaction. If so, the validated transaction may be added to the blockchain as a new block and propagated to storage throughout the network.

Once recorded, data in a block may be unable to be altered retroactively without alteration of all subsequent blocks, which may require collusion of a network majority. Thus, the decentralization and consensus may provide high fault tolerance and resistance to unauthorized modification. This may allow participants in the blockchain network to verify and audit transactions inexpensively and reliably.

The capabilities of blockchains may be used to manage content in a content delivery network in order to perform functions that content delivery networks were unable to perform using other content management mechanisms. Content delivery networks may leverage the capabilities of blockchains to perform functions related to tracking and enforcing access rights to content, storing and delivering content, tracking content pricing, charging for content access according to pricing, storing metadata about content, enabling content searching, billing for content access, routing content for delivery, providing payment to content providers, and so on.

The following disclosure relates to a content delivery network that uses blockchain to manage content. In various implementations, a content delivery network may specify access rights to content in a blockchain network and allow a content access device to access content when the blockchain network is unavailable using a local copy of the blockchain and reconciling upon reconnection. In some implementations, a content delivery network may track storage of available content in a blockchain and use the blockchain to provide different copies of requested items when the different copies can be provided faster, more efficiently, at a lower cost, and so on. In yet other implementations, a content delivery network may record changes to properties of content in a blockchain and evaluate received disputes by using the blockchain to determine whether a change to the properties of the content occurred prior to the dispute.

In this way, content delivery networks may use blockchains to perform functions that were not previously performable. These technological functions may also enable the content delivery networks to operate more efficiently while using less hardware, software, and/or network resources. Thus, the operation of the underlying electronic devices used to implement the content delivery may be improved.

These and other embodiments are discussed below with reference to FIGS. 1-10. However, those skilled in the art will readily appreciate that the detailed description given herein with respect to these Figures is for explanatory purposes only and should not be construed as limiting.

FIG. 1 depicts an example system 100 for using blockchain to manage content in a content delivery network. The system 100 may include one or more content delivery network devices 101 that may provide one or more items of content to one or more content access devices 102 over one or more communication networks 103. The system 100 may use a blockchain network system 104 to manage content stored within and/or otherwise accessible through the content delivery network. Content management may include tracking and enforcing access rights to content, storing and delivering content, tracking content pricing, charging for content access according to pricing, storing metadata about content, enabling content searching, billing for content access, routing content for delivery, providing payment to content providers, and so on.

For example, the content delivery network device 101 may communicate with the blockchain network system 104 via the communication network 103 to specify in a blockchain access rights to content. The content access device 102 may communicate with the blockchain network system 104 via the communication network 103 when requesting access to content. According to the access rights specified in the blockchain, the content access device 102 may be granted the access requested, denied the access requested, and so on. The content access device 102 may store a local copy of the blockchain. When the blockchain network system 104 is unavailable (such as due to blockchain network system 104 overload, blockchain network system 104 outage, unavailable network bandwidth in the communication network 103, communication network 103 outage, and so on), the content access device 102 may use the local copy of the blockchain to determine whether or not to allow a requested access. Upon reconnection to the blockchain network system 104, the local copy of the blockchain may be reconciled with the blockchain stored by the blockchain network system 104. One or more actions may be taken if changes were made to the blockchain network system 104 prior to reconnection that impact whether or not the access should have been allowed.

By way of another example, the content delivery network device 101 may communicate with the blockchain network system 104 via the communication network 103 to track storage of available content in a blockchain. The blockchain may track when an item of content is first stored in the system 100, each time another copy of the item of content is stored (such as where an item of content is stored in the system 100 for a first content provider and includes and/or is otherwise associated with a first accessory content, such as first advertising, and a new copy of the item of content is stored in the system for a second content provider and includes and/or is otherwise associated with a second accessory content, such as second advertising), each change to the item of content and/or metadata related to the item of content and/or other properties of the item of content, and so on. When a request for the item of content is received, the content delivery network device 101 may use the blockchain to determine that the copy of the item of content is available and may determine whether or not to provide the copy of the item of content (with or without the first accessory content, the second accessory content, and so on) instead of the item of content. In some situations, the content delivery network device 101 may determine to provide the copy of the item of content instead of the item of content when the copy of the item of content can be provided faster, more efficiently, at a lower cost, and so on.

In yet another example, the content delivery network device 101 may communicate with the blockchain network system 104 via the communication network 103 to record changes to properties of content in a blockchain. This may include each time that pricing is changed for an item of content, access rights are changed for an item of content, changes of an access status of the item of content, and/or any other properties of the item of content. This may allow the blockchain to be an auditable ledger that can be used to evaluate disputes. By way of illustration, a content provider may submit a dispute that an outdated price was charged for an accessed item of content and the content delivery network device 101 may evaluate the received dispute using the blockchain to determine whether or not the content provider submitted the price change prior to the disputed access. By way of yet another illustration, a user may submit a dispute related to access of a requested item of content (such as where the provided item of content was corrupt, where the provided item of content was incomplete, where the user never accessed and/or never finished accessing the item of content, and so on) and the content delivery network device 101 may evaluate the received dispute using the blockchain to determine whether or not a change to an access status related to the access of the item of content supports or contradicts the user's dispute.

Although the above illustrates and describes a number of examples of using the blockchain network system 104 to manage content stored within and/or otherwise accessible through the content delivery network, it is understood that these are examples. In various implementations, the system 100 may use blockchain network system 104 to manage content in a variety of similar and/or different ways. Various configurations are possible and contemplated without departing from the scope of the present disclosure.

The content access device 102 may be any kind of electronic device, such as one or more set top boxes, televisions, desktop computing devices, laptop computing devices, mobile computing devices, tablet computing devices, smart phones, wearable devices, and so on. The content access device 102 may include one or more processors 113, one or more non-transitory storage media 114 (which may take the form of, but is not limited to, a magnetic storage medium; optical storage medium; magneto-optical storage medium; read only memory; random access memory; erasable programmable memory; flash memory; and so on), one or more communication units 115, and/or one or more other components. The processor 113 may execute one or more instructions stored in the storage medium 114 to perform functions, such as requesting to access content, presenting content, communicating with the content delivery network device 101 and/or the blockchain network system 104 via the communication unit 115 and the communication network 103 (which may include one or more coaxial cable networks, terrestrial broadcast networks, satellite networks, internets, and so on), and so on.

Similarly, the content delivery network device 101 may be any kind of electronic device, such as one or more set top boxes, televisions, desktop computing devices, laptop computing devices, mobile computing devices, tablet computing devices, smart phones, wearable devices, and so on. The content delivery network device 101 may include one or more processors 110, one or more non-transitory storage media 111 (which may take the form of, but is not limited to, a magnetic storage medium; optical storage medium; magneto-optical storage medium; read only memory; random access memory; erasable programmable memory; flash memory; and so on), one or more communication units 112, and/or one or more other components. The processor 110 may execute one or more instructions stored in the storage medium 111 to perform functions, such as receiving requests to access content, providing content, obtaining one or more items of content (one or more broadcast or on demand movies, television shows, videos, images, audio files, games, applications, and so on) that may be stored in the storage medium 111 and/or stored elsewhere but accessible through the content delivery network device 101, communicating with the content access device 102 and/or the blockchain network system 104 via the communication unit 112 and the communication network 103, and so on.

The above illustrates and describes the system 100 as including particular components arranged in a particular configuration. However, it is understood that this is an example. In various implementations, the same, similar, and/or different components may be arranged in the same, similar, and/or different configurations without departing from the scope of the present disclosure. For example, in some implementations, the content delivery network device 101 and/or the content access device 102 may be part of the blockchain network system 104. Various configurations are possible and contemplated.

Figure 2:
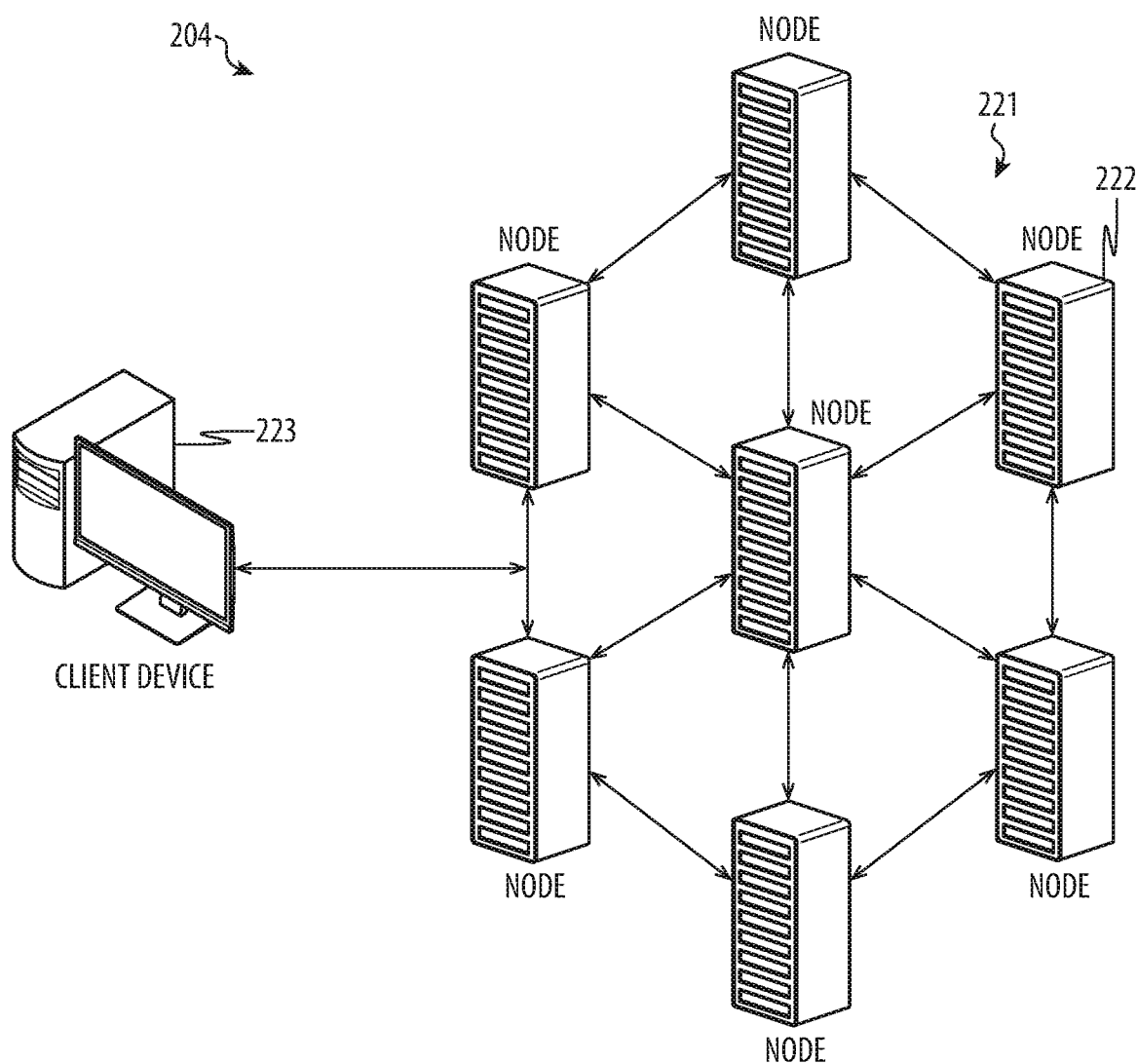
FIG. 2 depicts an example implementation of the blockchain network system.

FIG. 2 depicts an example implementation of the blockchain network system 204. The system 204 may include a blockchain network 221 that has multiple nodes 222 configured in a peer-to-peer configuration. Each node 222 may store a copy of a blockchain. The blockchain may include a number of blocks, such as an initial or "genesis" block and a most recent block. The nodes 222 may execute a software protocol for communicating with other nodes 222 in order to come to a consensus about validating new transactions, adding new validated transactions to the blockchain, and propagating the updated blockchain to the other nodes 222. The system 204 may be open, allowing any kind of computing device that can be configured to communicate using the appropriate protocol to be a node 222.

The system 204 may also include one or more client devices 223. The client device 223 may communicate with the blockchain network 221 in order to submit transactions, query the blockchain, and so on. The client device 223 may communicate with the blockchain network 221 as part of content management in a content delivery network. This may include performing a number of functions, such as tracking and enforcing access rights to content, storing and delivering content, tracking content pricing, charging for content access according to pricing, storing metadata about content, enabling content searching, billing for content access, routing content for delivery, providing payment to content providers, any of the functions discussed above with respect to the system 100 of FIG. 1, and so on.

In some examples, the client device 223 may be one or more of the content delivery network device 101 and/or the content access device 102 of the system 100 of FIG. 1. In other examples, the node 222 may be one or more of the content delivery network device 101 and/or the content access device 102 of the system 100 of FIG. 1. Various configurations are possible and contemplated without departing from the scope of the present disclosure.

Although the system 204 is illustrated and described as a particular configuration of a blockchain network system, it is understood that this is an example. Blockchain network systems may be configured in a variety of different arrangements without departing from the scope of the present disclosure.

For example, a blockchain network may be a hyperledger fabric blockchain network. A hyperledger fabric blockchain network may include one or more ordering nodes, a group of peer nodes that include one or more voting nodes and read nodes, and one or more certificate authority devices.

The group of peer nodes may be directed by the ordering node. For example, transactions received by the hyperledger fabric blockchain network related to a blockchain may be directed by the ordering node to the voting nodes. The voting nodes may come to a consensus about whether or not to validate the transaction in order to add the transaction to the blockchain according to the software protocol by which the hyperledger fabric blockchain network operates. Voting nodes may also store a copy of the blockchain and may be able to respond to requests to search and/or read blocks of the blockchain. Read nodes may store a copy of the blockchain and be able to respond to requests to search and/or read blocks of the blockchain without any role in validating transactions.

Unlike the permission-less arrangement of the system 204, device participation in a hyperledger fabric blockchain network may be controlled. Devices may need to obtain a certificate or similar credential by communicating with the certificate authority device in order to perform a role as an ordering node, a voting node, and/or a read node.

Blockchain networks may use a variety of technologies to work with portions of the blockchain rather than the entirety. For example, a hyperledger fabric blockchain network may use hyperledger channels. A hyperledger channel may function as a private "subnet" of communication between two or more members of the hyperledger fabric blockchain network. The channel may be identified by memberships, nodes of the group of peer nodes that belong to those memberships, the shared portion of the blockchain corresponding to the channel (including the genesis block of the channel, regardless whether or not that block is the actual genesis block of the blockchain itself), chaincode application(s), and the ordering node(s). Transactions on the hyperledger fabric blockchain network may be executed on the channel. If so, each member may need to be authenticated to transact on the channel. Each node of the group of peer nodes that joins the channel may have its own identity given by a membership services provider. The membership services provider may authenticate each node that joins to its channel peers and services. Configuration information about the channel policies, memberships, and anchor peers may be stored, such as in the genesis block of the channel.

However, as with the system 204, discussion of a hyperledger fabric blockchain network is intended to be limiting. Blockchain network systems may be configured in a variety of different arrangements without departing from the scope of the present disclosure.

Figure 3:
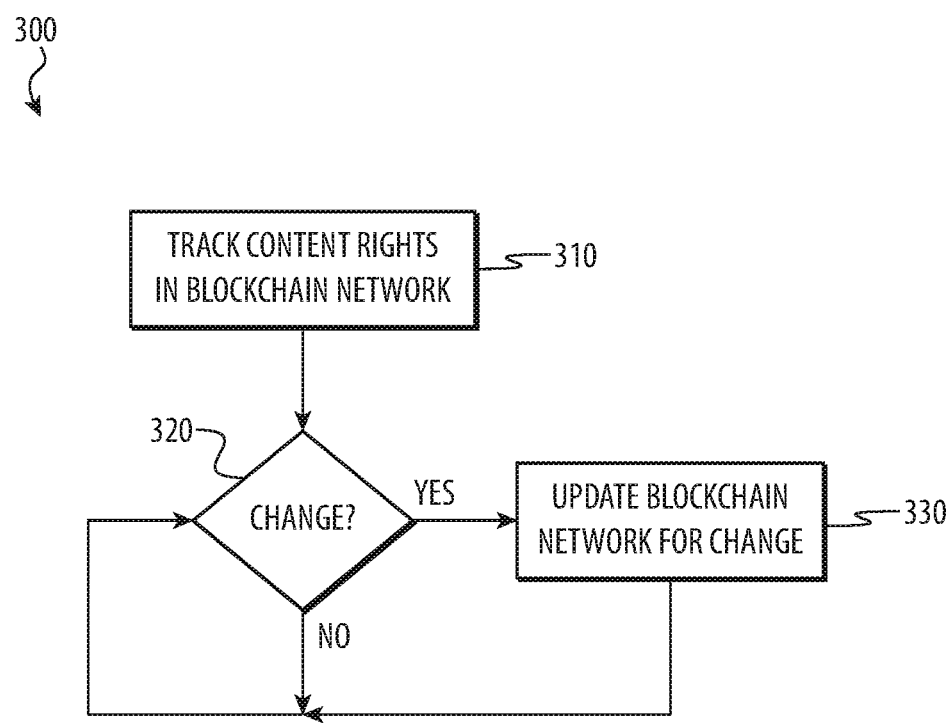
FIG. 3 is a flow chart illustrating a first example method for using blockchain to manage content in a content delivery network. This method may be performed by the systems of FIGS. 1 and/or 2.

FIG. 3 is a flow chart illustrating a first example method 300 for using blockchain to manage content in a content delivery network. This method 300 may be performed by the systems 100, 204 of FIGS. 1 and/or 2.

At operation 310, an electronic device (such as the content delivery network device 101 of FIG. 1) may track content rights in a blockchain network (such as the blockchain network system 104 of FIG. 1). For example, tracking content rights may include tracking content access rights, or rights that different users may have to access different items of content (which may include conditions under which the users may access the content). By way of another example, tracking content rights may include rights that a content delivery network may have to provide the content (which may include advertising and/or other accessory content required and/or prohibited to be provided with the content, time and/or other restrictions regarding the content provider network's rights to provide the content, and so on).

At operation 320, the electronic device may determine whether or not there is a change to the content rights. If there is no change, the flow may return to operation 320 where the electronic device again determines whether or not there is a change to the content access rights. Otherwise, the flow may proceed to operation 330.

At operation 330, after the electronic device determines that there is a change to the content access rights, the electronic device may update the blockchain network for the change. This may involve adding a new block to the blockchain that reflects the change. The change may include granting of additional rights, adding restrictions on existing rights, specifying content rights for new content, removing existing content rights, and so on.

In various examples, this example method 300 may be implemented as a group of interrelated software modules or components that perform various functions discussed herein. These software modules or components may be executed within a cloud network and/or by one or more computing devices, such as the content delivery network device 101 of FIG. 1.

Although the example method 300 is illustrated and described as including particular operations performed in a particular order, it is understood that this is an example. In various implementations, various orders of the same, similar, and/or different operations may be performed without departing from the scope of the present disclosure.

For example, in some implementations, the method 300 may include the additional operations of receiving a request to provide access to an item of content and/or determining to provide access to the item of content in response to the request using content rights specified in the blockchain network. In other examples, the method 300 may be used to generate and/or maintain a blockchain network that is used in another method, such as the method 400 of FIG. 4. Various configurations are possible and contemplated without departing from the scope of the present disclosure.

Figure 4:
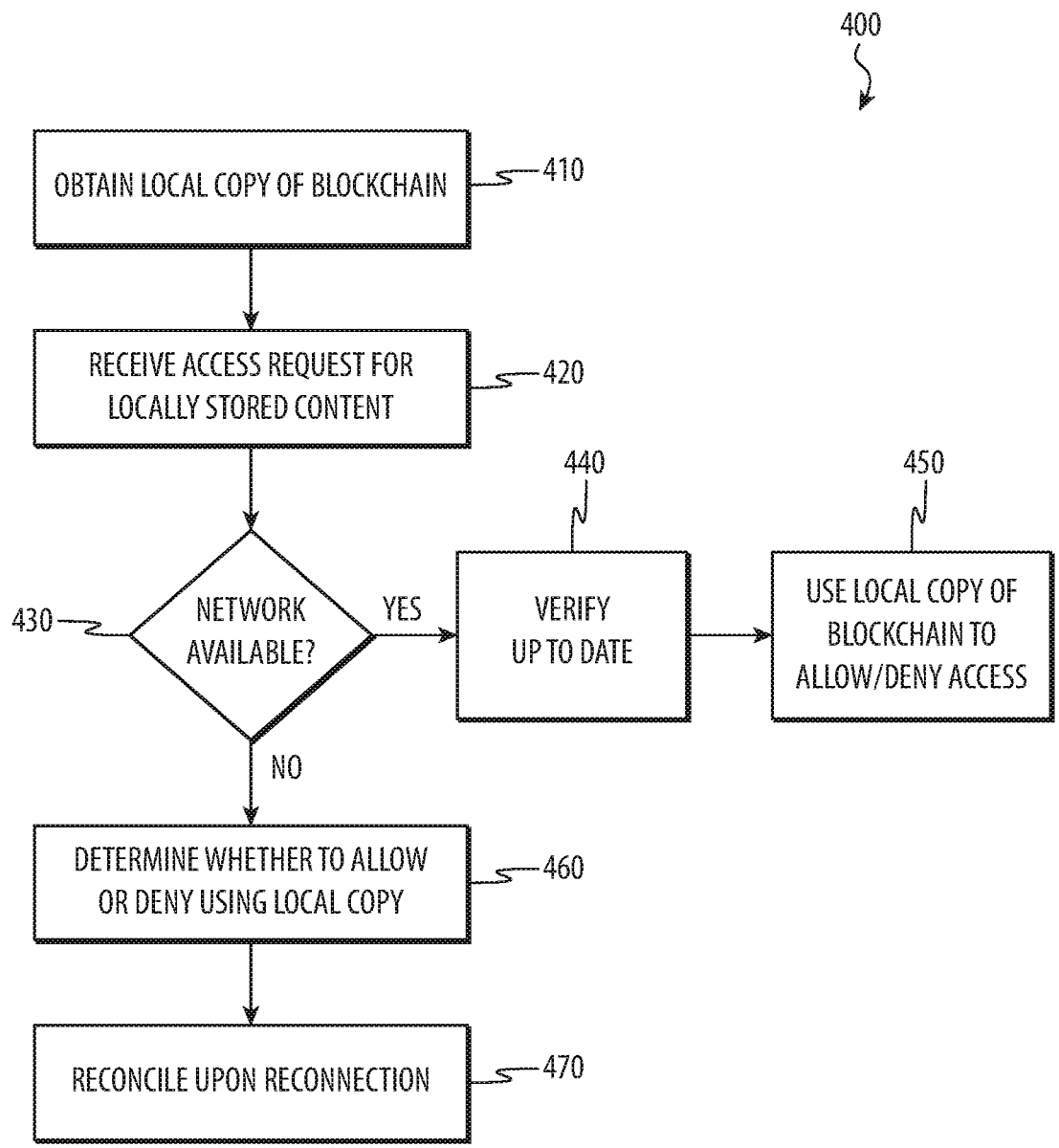
FIG. 4 is a flow chart illustrating a second example method for using blockchain to manage content in a content delivery network. This method may be performed by the systems of FIGS. 1 and/or 2.

FIG. 4 is a flow chart illustrating a second example method 400 for using blockchain to manage content in a content delivery network. This method 400 may be performed by the systems 100, 204 of FIGS. 1 and/or 2.

At operation 410, an electronic device (such as the content access device 102 of FIG. 1) obtains a local copy of a blockchain. The blockchain may specify access rights to content in a content delivery network. The electronic device may obtain the local copy of the blockchain from a blockchain network that generates and/or maintains the blockchain. In some implementations, the electronic device may obtain an updated local copy of the blockchain whenever the blockchain changes and use the local copy to determine whether or not to allow any requests to access content. In other implementations, the electronic device may use the blockchain network to determine whether or not to allow any requests to access content and use the local copy of the blockchain for access determination when the blockchain network is unavailable. In various implementations, the electronic device may obtain the local copy of the blockchain prior to entering a mode where the blockchain network will be unavailable, such as where the electronic device is operable in a local mode where the electronic device is connected to a communication network through which the blockchain network is available and a remote mode where the electronic device is disconnected from the communication network and is thus unable to communicate with the blockchain network.

At operation 420, the electronic device receives an access request for locally stored content. The request may be received from a user and may be a request to access content stored on the electronic device, such as one or more digital video recordings.

At operation 430, the electronic device determines whether or not the blockchain network is available. The blockchain network may be unavailable if the blockchain network is in an outage condition, is too busy to respond, is communicably connected to the electronic device via a communication medium that is in an outage condition or does not have sufficient available network bandwidth for communication between the electronic device and the blockchain network, and so on. If the blockchain network is available, the flow may proceed to operation 440 where the electronic device verifies that the blockchain is up to date before the flow proceeds to operation 450 and the local copy of the blockchain is used to allow/deny access to the requested locally stored content. Otherwise, the flow proceeds to operation 460.

At operation 460, after the electronic device determines that the blockchain network is unavailable, the electronic device determines whether or not to allow the access using the local copy of the blockchain. The flow may then proceed to operation 470 where the electronic device reconciles the local copy of the blockchain with the blockchain network upon reconnection to the blockchain network.

For example, reconciliation may involve determining whether or not there were any changes to the blockchain network prior to reconnection that impact any accesses requested during the interim. The local copy of the blockchain may include access rights to an item of content that may be revoked while the blockchain network is unavailable. As the local copy of the blockchain may not include this revocation since the blockchain network is unavailable, the electronic device may allow access to the item of content upon request while the blockchain network is unavailable. Upon reconnection, reconciliation may involve determining that the revocation occurred prior to the access and that the revocation impacts the access in that the access should not have been granted. One or more actions may be taken to remedy the unauthorized access, such as requiring access rights be obtained to account for the access that was previously granted. For example, this may include automatically charging for rights corresponding to the granted access, adding a charge to a content delivery network account in order to bill for the rights corresponding to the granted access, locking access to content stored in and/or otherwise available through the electronic device until rights corresponding to the granted access are obtained, denying subsequent access requests until rights corresponding to the granted access are obtained, removing content stored in the electronic device until rights corresponding to the granted access are obtained, and so on.

By way of another example, the electronic device may request additional access rights during the unavailability. These additional access rights may be added as new blocks to the local copy of the blockchain. Access may be granted using these additional added access rights. In this way, a user may be able to request additional access rights even if the blockchain network is currently unavailable and the blockchain network may be updated to reflect the changes accordingly. Upon reconnection, reconciliation may involve updating the blockchain network with any new blocks in the local copy of the blockchain. This may involve charging one or more financial accounts for the requested additional rights, adding a charge to a content delivery network account in order to bill for the requested additional access rights, and so on.

In various examples, this example method 400 may be implemented as a group of interrelated software modules or components that perform various functions discussed herein. These software modules or components may be executed within a cloud network and/or by one or more computing devices, such as the content access device 102 of FIG. 1.

Although the example method 400 is illustrated and described as including particular operations performed in a particular order, it is understood that this is an example. In various implementations, various orders of the same, similar, and/or different operations may be performed without departing from the scope of the present disclosure.

For example, the method 400 is illustrated and described at operation 440 as verifying that the local copy of the blockchain is up to date prior to using the local copy of the blockchain to evaluate access rights while the blockchain network is available. However, it is understood that this is an example. In other implementations, this operation 440 may be omitted. Various configurations are possible and contemplated without departing from the scope of the present disclosure.

Further, the method 400 is illustrated and described at operation 450 as using the local copy of the blockchain to evaluate access rights while the blockchain network is available. However, it is understood that this is an example. In other implementations, the blockchain network may be used to evaluate access rights when it is available and the local copy of the blockchain may be used only when the blockchain network is unavailable. Various configurations are possible and contemplated without departing from the scope of the present disclosure.

Figure 5A:
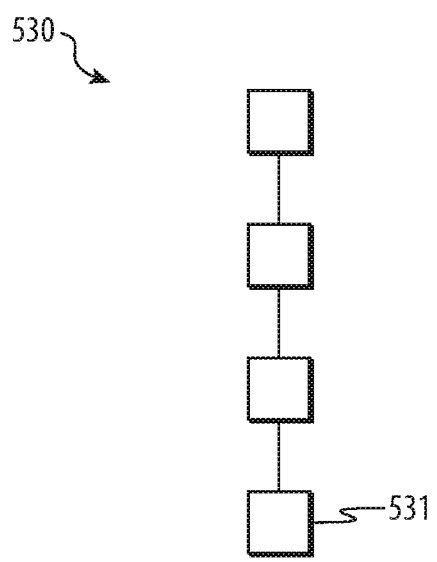
FIG. 5A depicts an example blockchain that tracks content rights for a user.

By way of illustration of the method 400 of FIG. 4, FIG. 5A depicts an example blockchain 530 that tracks content rights for a user. The blockchain 530 includes a block 531, which may correspond to grant of access rights to an item of content in a blockchain network for a user via a content access device. The content access device may obtain a local copy of the blockchain 530 and use that local copy of the blockchain 530 to evaluate access requests while the blockchain network is unavailable. Upon reconnection, the local copy of the blockchain 530 may be reconciled with the blockchain to determine whether or not any changes occurred prior to reconnection that impact any accesses that were granted.

Figure 5B:
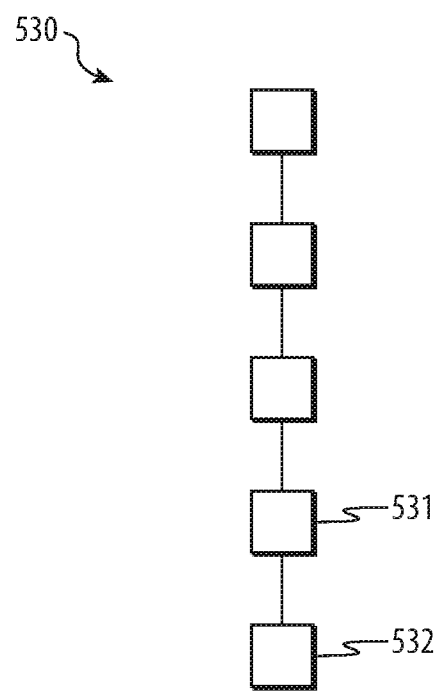
FIG. 5B depicts the example blockchain of FIG. 5A after updating to reflect revocation of rights to an item of content.

For example, FIG. 5B depicts the example blockchain 530 of FIG. 5A after updating to reflect revocation of rights to the item of content. The blockchain 530 includes a block 532, which may correspond to the revocation. If this revocation is made during the unavailability of the blockchain network, unauthorized access may have been granted. If the blockchain 530 indicates that the revocation occurred after the access, the access may still not have been unauthorized despite the revocation as the access was granted prior to the revocation. However, if the revocation preceded the access grant, the access may have been unauthorized and an action may be taken to remedy the unauthorized access.

Figure 5C:
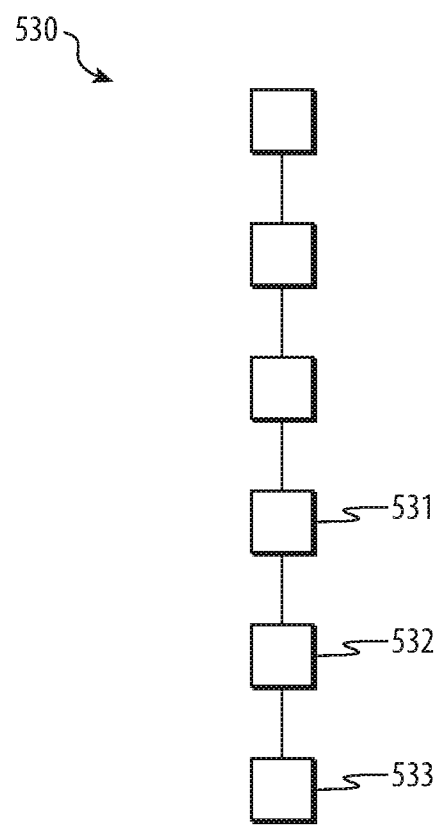
FIG. 5C depicts the example blockchain of FIG. 5B after updating to reflect restoration of rights to the item of content.

For example, FIG. 5C depicts the example blockchain 530 of FIG. 5B after updating to reflect restoration of rights to the item of content. The blockchain 530 includes a block 533, which may correspond to restoration of the rights to the item of content. In short, the user may be required to obtain access rights to the item of content since the user accessed the item of content after the previous access rights had been revoked.

However, it is understood that this is an example. Various configurations and uses of the blockchain 530 are possible and contemplated without departing from the scope of the present disclosure.

Figure 6:
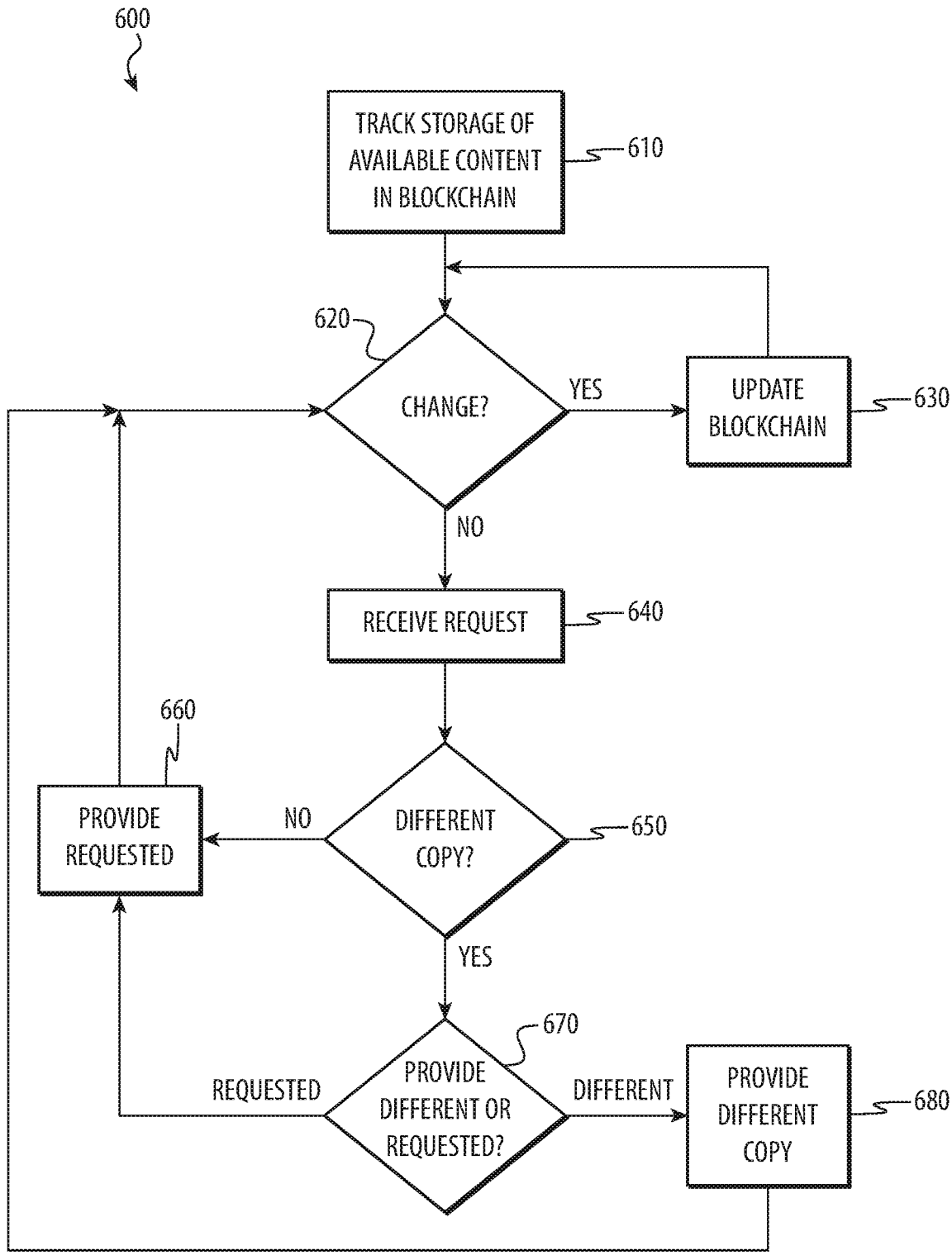
FIG. 6 is a flow chart illustrating a third example method for using blockchain to manage content in a content delivery network. This method may be performed by the systems of FIGS. 1 and/or 2.

FIG. 6 is a flow chart illustrating a third example method 600 for using blockchain to manage content in a content delivery network. This method 600 may be performed by the systems 100, 204 of FIGS. 1 and/or 2.

At operation 610, an electronic device (such as the content delivery network device 101 of FIG. 1) tracks storage of available content in a blockchain of a blockchain network. The storage of each item of content may be tracked in a single chain of blocks even if there are multiple copies of the item of content from one or more different content sources (which may include and/or be associated with the same and/or different accessory content, such as first advertising content included in and/or associated with a first copy of the item of content and second advertising content included in and/or associated with a second copy of the item of content). For example, the chain of blocks may be started when an item of content is first made available through a content delivery network and each change, update, additional copy, and so on may be indicated in additional blocks added to the chain.

At operation 620, the electronic device may determine whether or not a change to the item of content occurs. Such a change may include addition of a copy of the item of content, association with new and/or different accessory content (such as advertising), addition of new and/or different accessory content in the item of content, changes to metadata describing the item of content, changes in storage location, changes in pricing, changes in access rights, and so on. If so, the flow may proceed to operation 630 where the electronic device may update the blockchain for the change before the flow returns to operation 620 and the electronic device may determine whether or not another change to the item of content occurs. Otherwise, the flow may proceed to operation 640.

At operation 640, the electronic device may receive a request for the item of content. Multiple copies of the item of content may be available and the request may specify one of the copies. For example, the request may be for movie X provided by an ACB Studios content provider.

At operation 650, the electronic device may determine whether or not there is a different copy of the requested item of content than the specific copy requested. If not, the flow may proceed to operation 660 where the electronic device may provide the requested copy of the item of content and the flow may return to operation 620 and the electronic device may determine whether or not another change to the item of content occurs. Otherwise, the flow may proceed to operation 670.

At operation 670, after the electronic device determines that there is a different copy of the requested item of content than the specific copy requested, the electronic device may determine whether or not to provide the different copy of the item of content instead of the requested copy of the item of content. This determination may be made according to evaluation of a number of different factors. For example, the electronic device may determine that the different copy of the item of content can be provided faster than the requested item of content. By way of another example, the electronic device may determine that first content delivery network resources that would be used to provide the item of content (such as network bandwidth along a first network transmission path, servers that provide content, and so on) are more burdened than second content delivery network resources that would be used to provide the different copy of the item of content. In yet another example, the electronic device may determine that the different copy of the item of content is associated with a lower cost than the requested item of content (such as where the different copy of the item of content is provided by a content provider who charges less than a content provider that provides the requested item of content). In still another example, the electronic device may make the determination in response to user input, such as where the electronic device presents information regarding different available copies and allows a user to select the copy to be provided.

If the electronic device determines to provide the different copy of the item of content instead of the requested copy of the item of content, the flow may proceed to operation 680 where the electronic device may provide the different copy of the item of content before the flow returns to operation 620 and the electronic device may determine whether or not another change to the item of content occurs. Otherwise, the flow may proceed to operation 660 where the electronic device may provide the requested copy of the item of content and the flow may return to operation 620 and the electronic device may determine whether or not another change to the item of content occurs.

In various examples, this example method 600 may be implemented as a group of interrelated software modules or components that perform various functions discussed herein. These software modules or components may be executed within a cloud network and/or by one or more computing devices, such as the content delivery network device 101 of FIG. 1.

Although the example method 600 is illustrated and described as including particular operations performed in a particular order, it is understood that this is an example. In various implementations, various orders of the same, similar, and/or different operations may be performed without departing from the scope of the present disclosure.

For example, in some implementations, first and second copies of an item of content may include and/or be associated with first and second accessory content, such as first and second advertising. When the first copy of the item of content is requested and the electronic device provides the second copy of the item of content instead, the electronic device may determine whether or not to provide the second copy of the item of content with the second advertising, with the first advertising, with both the first and the second advertising, with neither the first or the second advertising, and so on. This determination may be made according to availability of the first advertising and/or the second advertising, content rights associated with the first copy of the item of content and/or the second copy of the item of content, contractual obligations with a content provider of the first copy of the item of content and/or the second copy of the item of content, and so on. The electronic device may transmit the various items of data and/or combine and/or extract and/or otherwise process the various items of data in order to provide data in accordance with the various determinations mentioned above.

Figure 7:
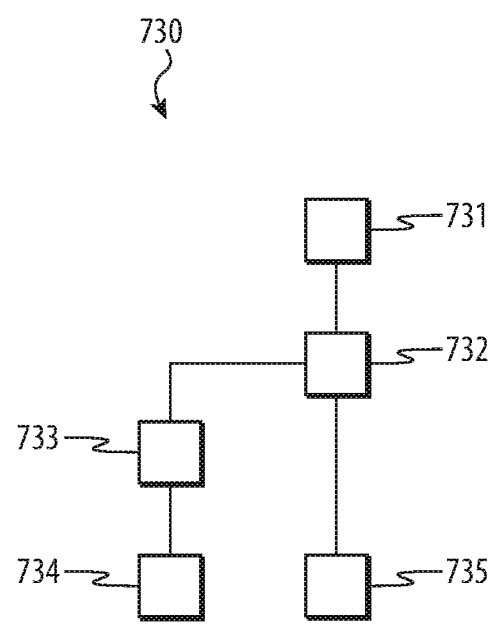
FIG. 7 depicts an example blockchain that tracks storage of content available via a content delivery network.

By way of illustration of the method 600 of FIG. 6, FIG. 7 depicts an example blockchain 730 that tracks storage of content available via a content delivery network. The blockchain 730 may include a block 731 that tracks when a first copy of an item of content is first made available through a content delivery network from a first content provider and/or source. Block 732 may be added to the blockchain 730 to record when a first advertising is associated with the first copy of the item of content. Block 733 may be added to the blockchain 730 to record when a second copy of the same item of content is made available through the content delivery network from a second provider and/or source. Block 734 may be added to the blockchain 730 to record when a second advertising is associated with the second copy of the item of content. Block 735 may be added to the blockchain 730 to record a change to metadata that describes the first copy of the item of content.

In accordance with the method 600 of FIG. 6, a request may be received for the first copy of the first item of content. The blockchain 730 may be used to determine that the first and second copies of the item of content are both available. One or more of the first and second copies of the item of content may then be provided, with or without the first and/or second advertising. Various configurations are possible and contemplated without departing from the scope of the present disclosure.

Figure 8:
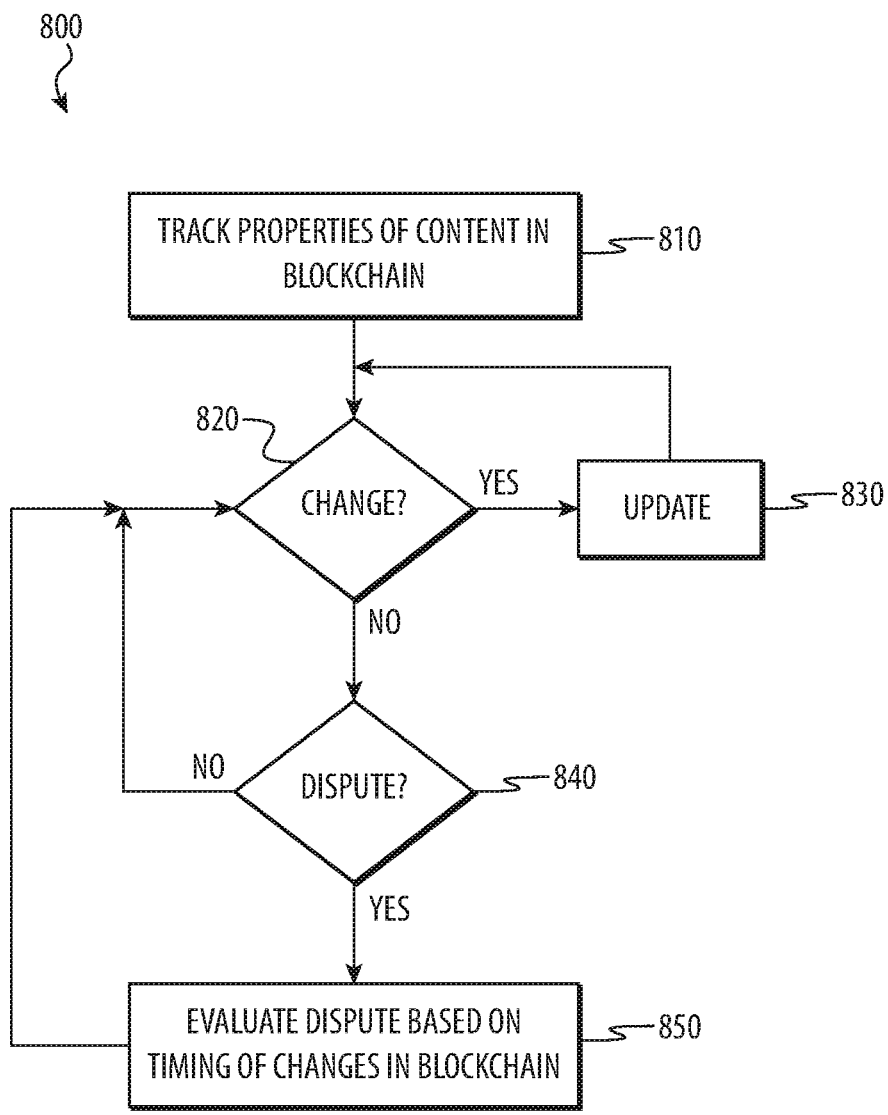
FIG. 8 is a flow chart illustrating a fourth example method for using blockchain to manage content in a content delivery network. This method may be performed by the systems of FIGS. 1 and/or 2.

FIG. 8 is a flow chart illustrating a fourth example method 800 for using blockchain to manage content in a content delivery network. This method 800 may be performed by the systems 100, 204 of FIGS. 1 and/or 2.

At operation 810, an electronic device (such as the content delivery network device 101 of FIG. 1) tracks properties of content available through a content delivery network using a blockchain of a blockchain network. As such, the blockchain may form an auditable ledger for property changes, when they occurred, who instructed them, and/or any other information related to the property changes. The properties may include access rights, current pricing, access requested, storage locations, metadata describing the content, and so on.

At operation 820, the electronic device may determine whether or not a property for an item of content changes. Such a change may include addition of a copy of the item of content, association with new and/or different accessory content (such as advertising), addition of new and/or different accessory content in the item of content, changes to metadata describing the item of content, changes in storage location, changes in pricing, changes to an access status, changes in access rights, and so on. If so, the flow may proceed to operation 830 where the electronic device may update the blockchain for the change before the flow returns to operation 820 and the electronic device may determine whether or not another change to a property for an item of content changes. Otherwise, the flow may proceed to operation 840.

At operation 840, the electronic device may determine whether or not a dispute is received. For example, a content provider and/or source may submit a dispute that an incorrect price was charged for access to an item of content. By way of another example, a user may submit a dispute that the user was incorrectly charged for access to an item because the user did not access the item of content, did not finish the item of content, the item of content was corrupt, and so on. If the electronic device determines that no dispute is received, the flow may return to operation 820 and the electronic device may determine whether or not another change to a property for an item of content changes. Otherwise, the flow may proceed to operation 850.

At operation 850, after the electronic device determines that a dispute is received, the electronic device may evaluate the dispute based on the timing of changes in the blockchain. In some implementations, the dispute may relate to access of content in the content delivery system and the electronic device may determine whether or not a change to the properties of the content occurred prior to the dispute. For example, in the situation where a content provider and/or source submits a dispute that an incorrect price was charged for access to an item of content, the electronic device may evaluate the dispute to determine whether or not the price update referenced by the content provider and/or source was made prior to the access to the item of content. By way of another example, in the situation where a user submits a dispute that the user was incorrectly charged for access to an item because the user did not access the item of content, the electronic device may evaluate the dispute to determine whether or not the user accessed the item of content prior to the dispute.

The flow may then return to operation 820 and the electronic device may determine whether or not another change to a property for an item of content changes.

In various examples, this example method 800 may be implemented as a group of interrelated software modules or components that perform various functions discussed herein. These software modules or components may be executed within a cloud network and/or by one or more computing devices, such as the content delivery network device 101 of FIG. 1.

Although the example method 800 is illustrated and described as including particular operations performed in a particular order, it is understood that this is an example. In various implementations, various orders of the same, similar, and/or different operations may be performed without departing from the scope of the present disclosure.

For example, the method 800 is illustrated and described as evaluating the dispute based on the timing of changes in the blockchain. However, this is an example. In other implementations, the electronic device may evaluate the dispute based on whether or not particular changes are recorded in the blockchain regardless of the timing of those changes. Various configurations are possible and contemplated without departing from the scope of the present disclosure.

Figure 9:
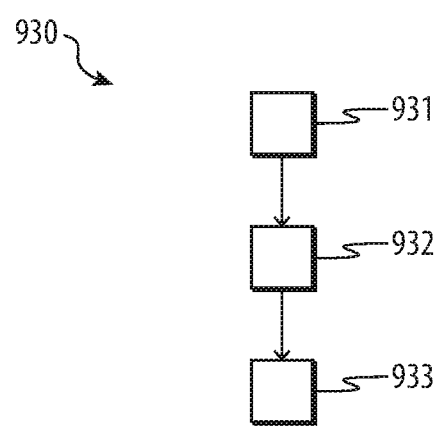
FIG. 9 depicts an example blockchain that tracks pricing changes to content available via a content delivery network.

By way of a first illustration of the method 800 of FIG. 8, FIG. 9 depicts an example blockchain 930 that tracks pricing changes to content available via a content delivery network. The blockchain 930 may include first block 931 that records when a first price is assigned to an item of content at a first time, a second block 932 that records a first price change to a second price for the item of content at a second time, and third block 933 that records a second price change to a third price for the item of content at a third time. Upon receipt of a dispute alleging that the second price was allegedly incorrectly charged for an access to the item of content at a time X, the blockchain 930 may be used to evaluate the dispute to see if a time of the access to the item of content is prior to that of the third block 933. The dispute may be resolved accordingly.

Figure 10:
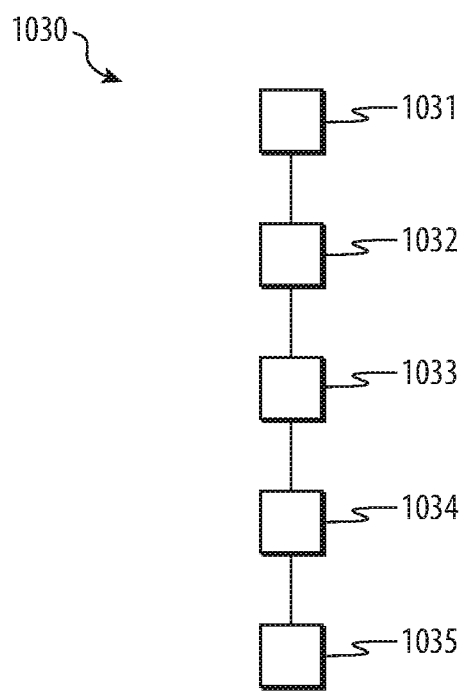
FIG. 10 depicts an example blockchain that tracks access status of a user's access to an item of content.

By way of a second illustration of the method 800 of FIG. 8, FIG. 10 depicts an example blockchain 1030 that tracks access status of a user's access to an item of content. The blockchain 1030 may include first block 1031 that records a request to download an item of content, a second block 1032 that records download of the item of content, a third block 1033 that records access of the downloaded item of content, a fourth block 1034 that records a halfway mark in presentation of the downloaded item of content, and a fifth block 1035 that records completed presentation of the downloaded item of content. Upon receipt of a dispute alleging that the user was not able to access and/or did not access and/or did not complete access of the item of content, the blockchain 1030 may be used to evaluate the dispute to determine that the user did access the item of content and completed the access. The dispute may be resolved accordingly.

The above illustrates and describes a number of embodiments. However, it is understood that these are examples. In various implementations, features from one or more of these embodiments may be combined and/or used with other embodiments. Various configurations are possible and contemplated without departing from the scope of the present disclosure.

In various implementations, an electronic device may include a non-transitory storage medium that stores instructions and a processor. The processor may execute the instructions to obtain from a blockchain network a local copy of a blockchain that specifies access rights to content in a content delivery network, receive a request to access a locally stored item of content while the blockchain network is unavailable, determine whether to allow the access using the local copy of the blockchain, and reconcile the local copy of the blockchain to the blockchain upon reconnection to the blockchain network.

In some examples, the access may be allowed using the local copy of the blockchain and the processor may reconcile the local copy of the blockchain to the blockchain by determining that no changes were made to the blockchain prior to the reconnection that impact allowance of the access. In other examples, the access may be allowed using the local copy of the blockchain and the processor may reconcile the local copy of the blockchain to the blockchain by determining that changes were made to the blockchain prior to the reconnection that impact allowance of the access and taking an action to remedy unauthorized access. In various such examples, the action may include billing an account for the access. In other such examples, the action may include denying subsequent access requests until access rights are updated to reflect the allowance of the access. In still other such examples, the action may include denying access to another locally stored item of content until access rights are updated to reflect the allowance of the access.

In a number of examples, the processor may reconcile the local copy of the blockchain to the blockchain by updating the blockchain for a right requested to allow the access using the local copy.

In some implementations, an electronic device may include a non-transitory storage medium that stores instructions and a processor. The processor may execute the instructions to track storage of content available via a content delivery network in a blockchain, receive a request for an item of content, use the blockchain to determine that a different copy of the item of content can be provided, determine to provide the different copy of the item of content, and provide the different copy of the item of content to satisfy the request.

In various examples, the item of content may be associated with a first accessory content, the different copy of the item of content may be associated with a second accessory content, and the processor may provide the first accessory content with the different copy of the item of content. In a number of examples, the item of content may be associated with a first accessory content, the different copy of the item of content may be associated with a second accessory content, and the processor may provide the second accessory content with the different copy of the item of content.

In some examples, the processor may determine to provide the different copy of the item of content because the processor determines that the different copy of the item of content can be provided faster than the item of content. In various examples, the processor may determine to provide the different copy of the item of content because first content delivery network resources that would be used to provide the item of content are more burdened than second content delivery network resources that are used to provide the different copy of the item of content. In a number of examples, the processor may determine to provide the different copy of the item of content because the different copy of the item of content is associated with a lower cost than the item of content. In some examples, the processor may determine to provide the different copy of the item of content in response to user input.

In a number of implementations, an electronic device may include a non-transitory storage medium that stores instructions and a processor. The processor may execute the instructions to record changes to properties of content in a content delivery system in a blockchain, receive a dispute related to access of the content in the content delivery system, and evaluate the dispute by using the blockchain to determine whether a change to the properties of the content occurred prior to the dispute.

In various examples, the dispute may relate to a price charged for an item of content and the change to the properties of the content may be a price change for the item of content. In some such examples, the price may be charged for the item at a first time, the price change may occur at a second time, and the processor may evaluate the dispute by using the blockchain to determine whether the second time is prior to the first time. In other examples, the dispute may relate to whether an item of content was accessed and the change to the properties of the content may be an access status for the item of content. In various implementations of such examples, the access status may indicate that the item of content was accessed, was partially accessed, was fully accessed, was not accessed, or could not be accessed.

In a number of examples, the processor may be operative to resolve the dispute based on whether or not the change to the properties of the content occurred prior to the dispute.

As described above and illustrated in the accompanying figures, the present disclosure relates to a content delivery network that uses blockchain to manage content. In various implementations, a content delivery network may specify access rights to content in a blockchain network and allow a content access device to access content when the blockchain network is unavailable using a local copy of the blockchain and reconciling upon reconnection. In some implementations, a content delivery network may track storage of available content in a blockchain and use the blockchain to provide different copies of requested items when the different copies can be provided faster, more efficiently, at a lower cost, and so on. In yet other implementations, a content delivery network may record changes to properties of content in a blockchain and evaluate received disputes by using the blockchain to determine whether a change to the properties of the content occurred prior to the dispute.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
a non-transitory storage medium that stores instructions; and
one or more processors configured to execute the instructions to perform operations to:
specify, by the electronic device, access rights to an item of content in a blockchain, each block of the blockchain implementing a cryptographic hash has associated with a prior block of the blockchain and a timestamp;

track, by the electronic device, storage of a different copy of the item of content locally at the non-transitory storage medium of the electronic device via the blockchain;

obtain from a blockchain network a local copy of the blockchain;

receive a request to access the item of content while the blockchain network is unavailable due to network failure;

determine to allow the access using the local copy of the blockchain;

determine, based at least in part on the local copy of the blockchain, that the different copy of the item of content can be provided to satisfy the request;

presenting information regarding the different copy of the item of content on a display and allowing a user to select the different copy of the item of content to be provided;

provide the different copy of the item of content;

reconnect to the blockchain network due to resolution of the network failure; and reconcile the local copy of the blockchain to the blockchain upon reconnection to the blockchain network, the reconcile comprising:
 determine that changes were made to the blockchain prior to the reconnection that impact the allowance of the access; and
 deny access to the item of content and the different copy of the item of content until access rights in the blockchain are updated to reflect the allowance of the access.

2. The electronic device of claim 1, wherein the operations further comprise:
 associating the item of content with a first accessory content;
 associating the different copy of the item of content with a second accessory content; and
 wherein the processor provides the first accessory content with the different copy of the item of content.

3. The electronic device of claim 1, wherein the operations further comprise:
 associating the item of content with a first accessory content;
 associating the different copy of the item of content with a second accessory content; and
 the processor provides the second accessory content with the different copy of the item of content.

4. The electronic device of claim 1, wherein determining to provide the different copy of the item of content is based at least in part on determining that the different copy of the item of content can be provided faster than the item of content.

5. The electronic device of claim 1, wherein the processor determining to provide the different copy of the item of content is based at least in part on determining first content delivery network resources that would be used to provide the item of content are more burdened than second content delivery network resources that are used to provide the different copy of the item of content.

6. The electronic device of claim 1, wherein determining to provide the different copy of the item of content is based at least in part on determining the different copy of the item of content is associated with a lower cost than the item of content.

7. The electronic device of claim 1, wherein determining to provide the different copy of the item of content is based at least in part on determining that a bandwidth of a first content delivery network that would be used to provide the item of content is more burdened than a bandwidth of a second content delivery network that is used to provide the different copy of the item of content.

8. The electronic device of claim 1, wherein determining to provide the different copy of the item of content is based at least in part on determining that the different copy of the item of content is accessible via a first content provider who charges less than a second content provider from whom the requested item of content is accessible.

9. The electronic device of claim 2, wherein:
 associating the item of content with a first accessory content further comprises associating the item of content with first advertising content; and
 associating the different copy of the item of content with the second advertising content.

10. The electronic device of claim 1, wherein the operations further comprise:
 determining the content delivery network is available; and
 reconciling the item of content with the different copy of the item of content.

11. The electronic device of claim 1, wherein determining to provide the different copy of the item of content is based at least in part on determining that the content delivery network is unavailable.

12. The electronic device of claim 1, wherein the blockchain is a hyperledger fabric blockchain network that includes one or more ordering blocks, a group voting of peer blocks, and at least one read block.

13. A method, comprising:
 specifying, by a content delivery network, access rights to a first copy of an item of content in a blockchain, each block of the blockchain implementing a cryptographic hash has associated with a prior block of the blockchain and a timestamp;
 tracking, by at least one processor of the content delivery network, storage of a second copy of the item of content locally via the blockchain;
 obtaining from a blockchain network a local copy of the blockchain;
 receiving, via a communication network, a request from a content access device to access the first copy of the item of content while the blockchain network is unavailable due to network failure;
 determining to allow the access using the local copy of the blockchain;
 determining, based at least in part of the local copy of the blockchain, that the second copy of the item of content can be provided in response to the request from the content access device;
 presenting information regarding the second copy of the item of content on a display and allowing a user to select the second copy of the item of content to be provided;
 determining to provide the second copy of the item of content using the at least one processor;
 providing, via the communication network, the second copy of the item of content to the content access device to satisfy the request;
 reconnecting to the blockchain network due to resolution of the network failure; and
 reconciling the local copy of the blockchain to the blockchain upon reconnection to the blockchain network, the reconciling comprising:

determining that changes were made to the blockchain prior to the reconnection that impact the allowance of the access; and denying access to the first copy of the item of content and the second copy of the item of content until access rights in the blockchain are updated to reflect the allowance of the access.

14. The method of claim 13, further comprising:

associating accessory content with the second copy of the item of content; and providing, to the content access device and via the communication network, the accessory content with the second copy of the item of content.

15. The method of claim 14, wherein the accessory content is different accessory content than is provided with the first copy of the item of content.

16. The method of claim 14, further comprising:

associating first accessory content with the first copy of the item of content;

associating second accessory content with the second copy of the item of content, wherein the second accessory content is different accessory content than the first accessory content; and providing, to the content access device, the second accessory content with the second copy of the item of content.

17. The method of claim 13, further comprising:

associating advertising content with the second copy of the items of content; and providing, to the content access device, the advertising content with the second copy of the item of content.

18. The method of claim 13, further comprising:

receiving a second request for a second item of content; and using the blockchain to determine that another copy of the second item of content is not available.

19. The method of claim 13, wherein the blockchain is a hyperledger fabric blockchain network that includes one or more ordering blocks, a group voting of peer blocks, and at least one read block.

* * * * *